(12) United States Patent
Omuta et al.

(10) Patent No.: US 9,896,264 B2
(45) Date of Patent: Feb. 20, 2018

(54) FREIGHT RACK

(71) Applicant: Rokko Engineering Co., Ltd., Hyogo (JP)

(72) Inventors: Mamoru Omuta, Hyogo (JP); Yukio Hanashiro, Hyogo (JP)

(73) Assignee: ROKKO ENGINEERING CO., LTD., Hyogo (JP)

( * ) Notice: Subject to any disclaimer, the term of this patent is extended or adjusted under 35 U.S.C. 154(b) by 29 days.

(21) Appl. No.: 15/023,021

(22) PCT Filed: Jun. 20, 2014

(86) PCT No.: PCT/JP2014/066444
§ 371 (c)(1),
(2) Date: Mar. 18, 2016

(87) PCT Pub. No.: WO2015/040912
PCT Pub. Date: Mar. 26, 2015

(65) Prior Publication Data
US 2016/0221749 A1    Aug. 4, 2016

(30) Foreign Application Priority Data

Sep. 20, 2013 (JP) ................................. 2013-196236

(51) Int. Cl.
*B60P 3/08*     (2006.01)
*B65D 90/00*    (2006.01)
*B65D 85/68*    (2006.01)

(52) U.S. Cl.
CPC ......... *B65D 90/0073* (2013.01); *B65D 85/68* (2013.01); *B60P 3/08* (2013.01); *B65D 2585/6867* (2013.01)

(58) Field of Classification Search
CPC .... B65D 85/68; B65D 90/0073; B65D 88/12; B65D 88/121; B65D 2585/6867; B60P 3/08
(Continued)

(56) References Cited

U.S. PATENT DOCUMENTS 2,695,810 A * 11/1954 Demos ...................... B60P 3/08
                                                         280/423.1
3,853,347 A * 12/1974 Harold ...................... B60P 3/08
                                                         410/11
(Continued)

FOREIGN PATENT DOCUMENTS

CN    101112927 A    1/2008
JP    2009120202 A   6/2009
(Continued)

*Primary Examiner* — Luan K Bui
(74) *Attorney, Agent, or Firm* — Bacon & Thomas, PLLC

(57) ABSTRACT

[Problem] Provided is a freight rack that improves rigidity for supporting freight and also allows pillars and a freight mounting frame to be folded or erected on a base member without use of a machine such as a forklift.
[Solution] On a base member (10), two sets of portal supports (30), (40), in which right and left pillars (31), (41) and a horizontal member (32), (42) are coupled to each other, stand with an interval in a front and rear direction, where the horizontal member is vertically shiftable along the pillars and fixed to the pillars at a selected height. A freight mounting frame (20) is supported by the horizontal member (42) of one portal support (40) so as to be rotatable in a vertical plane, and is also placed on the horizontal member (32) of the other portal support (30) so as to be movable in the front and rear direction.

6 Claims, 14 Drawing Sheets

(58) Field of Classification Search
USPC ..... 206/335; 220/1.5, 6, 7; 410/4, 9, 10, 11, 410/23, 24, 26, 29; 211/86.01
See application file for complete search history.

(56) References Cited

U.S. PATENT DOCUMENTS

| | | | |
|---|---|---|---|
| 4,343,401 A * | 8/1982 | Paulyson | B60P 3/08 105/375 |
| 4,797,049 A * | 1/1989 | Gearin | B60P 3/07 410/16 |
| 5,344,266 A | 9/1994 | Kolb | |
| 5,415,505 A * | 5/1995 | Halpin | B60P 3/077 220/1.5 |
| 5,427,485 A | 6/1995 | Henderson et al. | |
| 5,445,278 A * | 8/1995 | Gearin | B60P 3/07 211/85.8 |
| 5,567,111 A * | 10/1996 | Gearin | B60P 3/077 410/13 |
| 5,775,858 A * | 7/1998 | Bacon | B60P 3/08 410/13 |
| 6,857,833 B1 * | 2/2005 | Rains | B60P 3/08 410/26 |
| 2003/0152435 A1 | 8/2003 | Bishop | |
| 2005/0042055 A1 * | 2/2005 | Weir | B60P 3/08 410/26 |

FOREIGN PATENT DOCUMENTS

| | | |
|---|---|---|
| JP | 2011016536 A | 1/2011 |
| WO | 2009029059 A1 | 3/2009 |

* cited by examiner

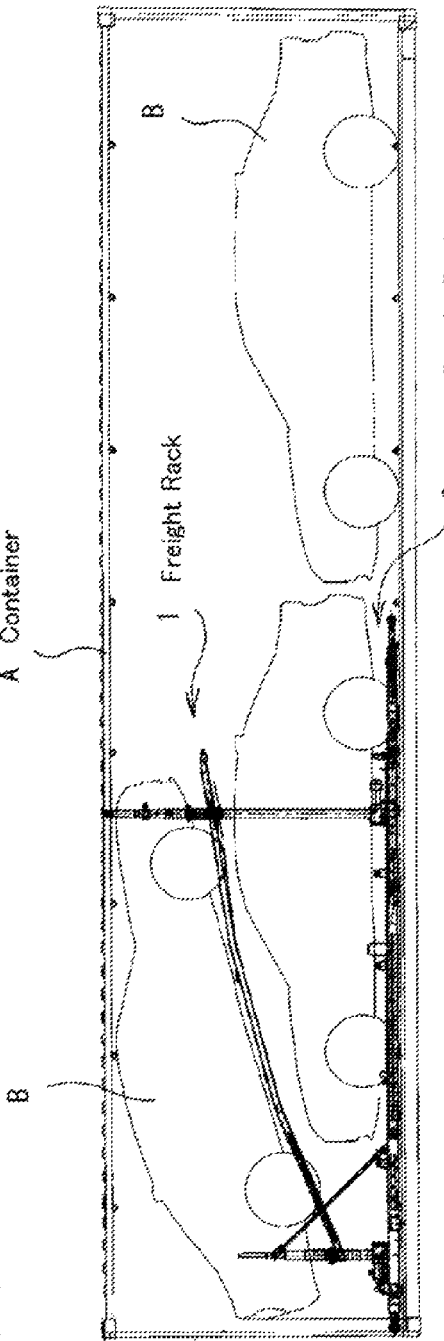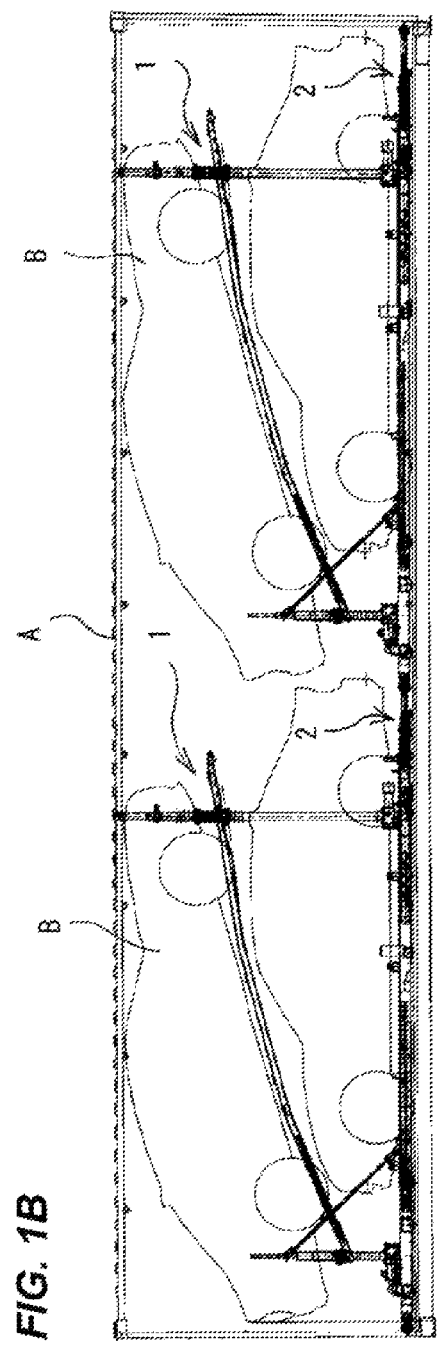
FIG. 1A
FIG. 1B

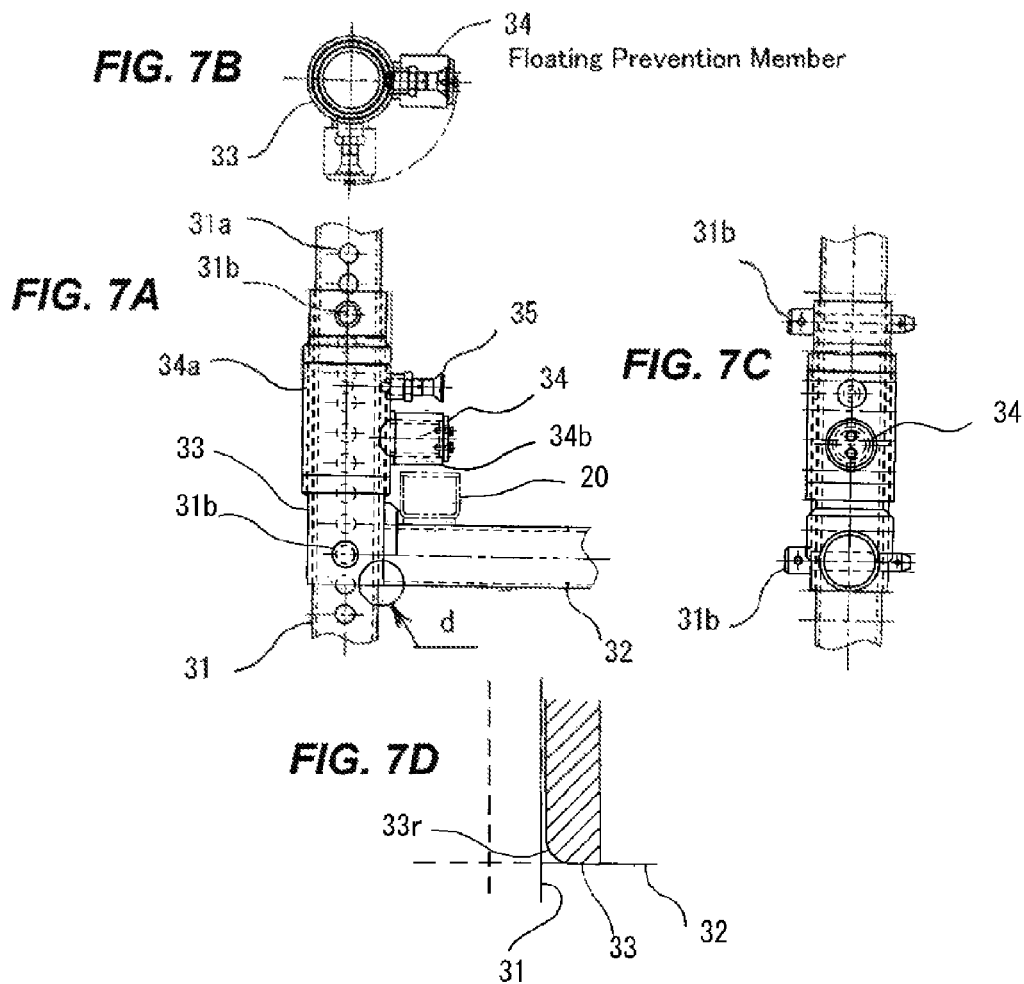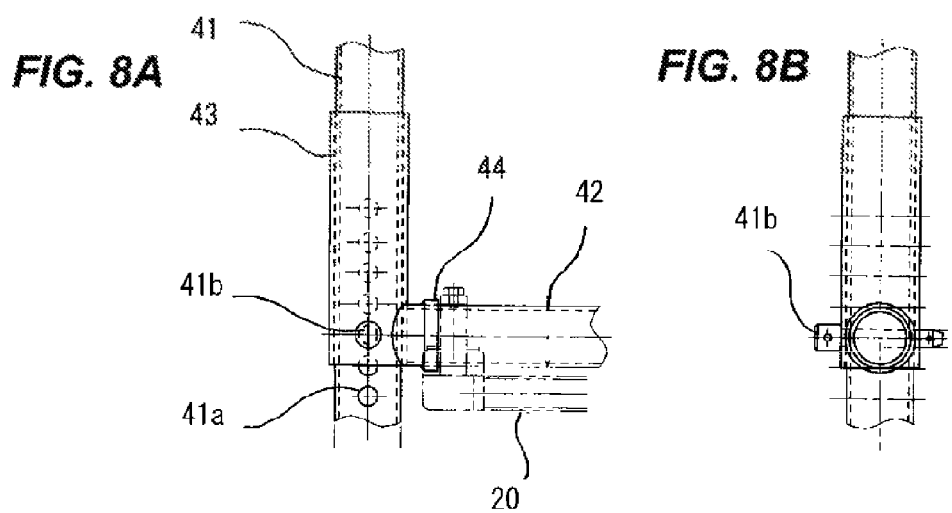

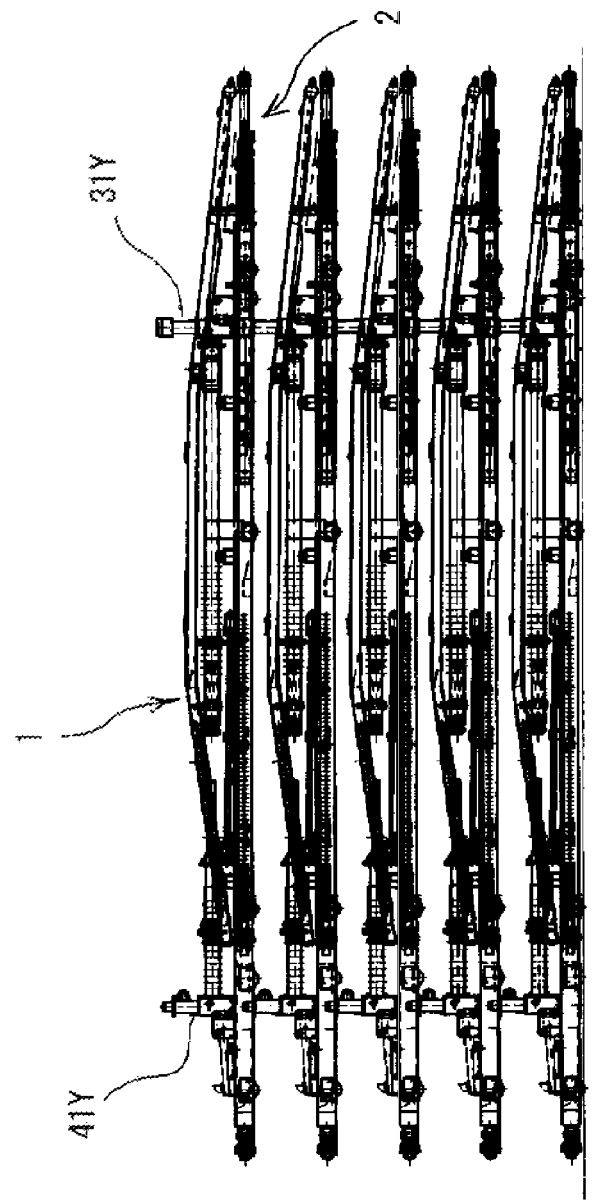

(PRIOR ART)

FREIGHT RACK

TECHNICAL FIELD

The present invention relates to a freight rack that is used for containerized freight transportation and is loaded with freight and disposed in a container. The freight rack is suitable for transporting relatively heavy freight such as vehicles including automobiles, furniture, household electrical appliances, office automation equipment, production machines and components thereof.

BACKGROUND ART

For the purpose of efficient containerized freight transportation, a freight support means called a rack is often used. The rack generally has a shelf-like portion (freight mounting frame) allowing freight to be housed one above another, along with a base member placed on the floor plate of a container. The shelf-like portion is used for housing as much freight as possible inside the container for efficient transportation. Such a rack is described, for example, in the following Patent Literature 1.

The freight rack described in Patent Literature 1 is shown in FIGS. 16 and 17, and has the following characteristics.

i) As in FIGS. 16A and 16B, a freight mounting frame 20 is supported by four pillars 31 and 41 standing on the right and left sides of a base member 10 with an interval in a front and rear direction. As the height of each supporting point of the freight mounting frame 20 by those pillars 31 and 41 is changeable, freight (such as automobiles) in different sizes may be appropriately housed in a container.

ii) The four pillars 31 and 41 as well as the freight mounting frame 20 may be folded on the base member 10 as in FIGS. 16C and 16D for a returning purpose, for example, after the completion of freight transportation. That is, each of the pillars 31 and 41 and the freight mounting frame 20 are coupled together with changeable angles in a vertical, longitudinal plane. Each of the pillars 31 and 41 stands on the base member 10 so as to be laid down forward or rearward. When the freight mounting frame 20 is set horizontally as in the figure C, the four pillars 31 and 41 may be laid down altogether, and the freight mounting frame 20 may be stacked on the base member 10 as in the figure D.

iii) Each of the pillars 31 and 41 and the freight mounting frame 20 are coupled to each other with a structure shown in FIGS. 17A and 17B. Specifically, each pillar 31 and 41 has a groove shape with a C-shaped cross section. The freight mounting frame 20 has a moving body part 20Y that is rotatable through a shaft portion 20X extending right and left, and each moving body part 20Y is housed inside the groove space of each pillar 31 and 41. At contacting sections between the moving body parts 20Y and the pillars 31 and 41, a roller or a low frictional material is mounted so as to make the vertical movement of the moving bodies smooth. It is noted that reference numeral 20Z in the figures indicates a support pin that is inserted through holes of the pillars 31 and 41 so as to stop the vertical movement of the moving bodies 20Y.

CITATION LIST

Patent Literature

[PTL 1] Japanese Unexamined Patent Application Publication No. 2011-16536

SUMMARY OF INVENTION

Technical Problem

In the case of the freight rack described in Patent Literature 1, freight is loaded on the freight mounting frame, and positions in relation to another freight item arranged underneath may be adjusted by changing the height or inclination of the frame. Thus, much freight may be housed inside a container, allowing efficient transportation.

However, the freight rack described in Patent Literature 1 has the following problems. Namely, a) In addition to the fact that each pillar stands independently on the base member, each pillar and the freight mounting frame are coupled in a structure where the moving body is housed inside the groove-shaped pillar having a C-shaped cross section and thus gaps are likely to form, so that each pillar is likely to incline or rock right and left unless provided with sufficient reinforcement. Also, since the groove-shaped pillar is used and the moving body having a roller or a low frictional material is arranged in each pillar, the rack is structurally expensive.

b) Although the four pillars and the freight mounting frame may be folded on the base member as in FIGS. 16C and 16D for a returning purpose, for example, as described above, there is a need to use a cargo-handling machine such as a forklift or a crane for being folded or reversibly erected. This is because all the pillars and the freight mounting frame are simultaneously folded or erected altogether while being coupled to each other, so that a significant amount of force is required for operating these members.

The present invention is made in consideration of the above-described issues, and the object of the invention is to provide a freight rack (a) that can improve support rigidity of a freight mounting frame by reducing right and left inclination or rocking of each pillar, and (b) that enables the pillars and the freight mounting frame to be folded or erected on a base member without using a machine such as a forklift.

Solution to Problem

The present invention is a freight rack that has a base member that is movable in a front and rear direction on the floor plate of a container, and a freight mounting frame that is supported above the base member and that is for mounting freight, wherein two sets of portal supports, in which right and left pillars and a horizontal member are coupled to each other, stand on the base member with an interval in the front and rear direction, where the horizontal member is vertically shiftable along the pillars and fixed to the pillars at a selected height, and the freight mounting frame is supported by the horizontal member of one portal support so as to be rotatable in a vertical plane (that is, around the horizontal member) and is also placed on the horizontal member of the other portal support so as to be movable in the front and rear direction.

It is noted that the "front and rear" refers to the longitudinal direction of the container. The front is a far side from the container's entrance while the rear is the near side to the container's entrance inside the container (The same hereinafter). Also, the "right and left" refers to the width direction of the container, and the left is the left side facing the above-described front (The same hereinafter).

According to the freight rack of the invention, the height and inclination of the freight mounting frame may be changed by shifting vertically each horizontal member of the two sets of portal supports that are arranged with an interval in the front and rear direction. Specifically, as the horizontal members of the front and rear portal supports are shifted by the same height, the height of the freight mounting frame may also be changed. As only one of the horizontal members is shifted vertically, the freight mounting frame rotates around one horizontal member and also moves in the front and rear direction on the other horizontal member, thus changing its inclination at the same time (see FIG. 2).

Each pillar does not independently stand on the base member. Two front pillars and two rear pillars are coupled to a horizontal member respectively to constitute the portal supports. Thus, the adaptation of a structure with a small gap at coupled sections between the pillars and the horizontal member can increase the rigidity of the portal support and reduce the right and left inclination and rocking of the pillars.

It is preferable that the two sets of portal supports standing on the base member may be individually laid down on the base member so as to become parallel to the base member.

In such a case, the portal support including each pillar and the freight mounting frame may be folded on the base member or reversibly returned to a usage state only by human power without using a machine such as a forklift. The reason why it is possible to be folded or else without using a machine is that there is no need to simultaneously lay down or erect all the pillars altogether (see FIG. 11). For example, in laying down the pillars (portal support) which rotatably support the freight mounting frame, the other portal support which supports the freight mounting frame placed on the horizontal member may keep being erected. In this case, as the one portal support is laid down on the base member, the freight mounting frame moves in the front and rear direction on the horizontal member of the other portal support in an erected position. The other portal support may be solely laid down after the one portal support is laid down on the base member. The front and rear portal supports including the right and left pillars may be laid down or erected one set by one set, instead of simultaneously, so that the weight and the frictional resistance from the operation is small and thus only human power is required for work such as folding.

The horizontal member of each portal support has a hollow member (such as a round pipe) at both right and left sides. It is preferable that the pillar (for example, a round pipe slightly narrower than the round pipe described above) is run through the hollow member so as to allow relative shift in a vertical direction. FIG. 7 and FIG. 8 show examples of such a horizontal member and pillar.

As each pillar and a horizontal member are constructed and coupled to each other as described above, the portal support has an extremely simple structure, which is advantageous in terms of cost and enhances rigidity to effectively restrict the inclination and rocking of the pillar. Since the freight mounting frame is rotatably supported by the horizontal member of such a portal support, the freight mounting frame is easily kept in the state of reduced rocking and vibrations, thereby allowing freight to be loaded with stability.

It is preferable that the hollow member of the horizontal member in each portal support described above has a smooth curved surface between an inner circumferential surface and both end faces (at a corner which normally has a 90° ridgeline). The corner may be rounded as in, e.g., FIG. 7D.

It is desirable that when the pillar is run through the hollow member of the horizontal member, the horizontal member smoothly shifts vertically along the pillar only with a minute gap relative to the pillar. If there is a sharp ridgeline at the corner between the inner circumferential surface and both end faces of the hollow member, the ridgeline is likely to get caught at a side of the pillar. However, as a smooth curved surface is formed at a section corresponding to the corner as described above, the horizontal member is likely to smoothly shift vertically, together with the hollow member, without making the hollow member get caught at the side of the pillar.

It is preferable that, in the above-described freight rack, a floating prevention member for the freight mounting frame is provided at (the horizontal member of) the portal support at the side where the freight mounting frame is placed on the horizontal member, and the floating prevention member projects above the freight mounting frame so as to prevent the freight mounting frame from rising independently from the horizontal member and also is retractable from above the freight mounting frame. An example of the floating prevention member is shown in FIG. 7.

First, as such a floating prevention member projects above the freight mounting frame, the freight mounting frame is prevented from lifting up with vibrations or the like during freight transportation, and freight transportation is likely to stay stable.

Secondly, with the floating prevention members projecting as described above, the horizontal member simultaneously rises when the freight mounting frame is raised during a freight loading process, so that the heights of both the freight mounting frame and the horizontal member can be adjusted at the same time. The height and inclination of the freight mounting frame are generally adjusted by using a cargo-handling machine such as a forklift (see FIG. 2) due to its weight. However, when the horizontal member is raised along with a freight mounting frame as described above, the horizontal member can be immediately fixed to the pillars at the raised height. That is, the height or the like of the freight mounting frame and the horizontal member, on which the freight mounting frame is placed, can be adjusted simultaneously and thus efficiently.

However, if the floating prevention member keeps projecting above the freight mounting frame, it would become an obstacle in case of laying down or erecting the pillars as described above (see FIG. 11), so that the floating prevention member is retracted from above the freight mounting frame in folding the freight rack, for example.

It is preferable that the floating prevention member has a rotary body at a part where the member is in contact with the freight mounting frame while projecting above the freight mounting frame. Also in the example of FIG. 7, a rotating roller is mounted to the floating prevention member at the outer periphery of an inside shaft portion.

In raising the freight mounting frame as described above, the floating prevention member also rises while being in contact with the freight mounting frame. In this case, there is a relative displacement in the front and rear direction between the freight mounting frame and the floating prevention member. Accordingly, if there is a large friction between the frame and the member, a great force in the front and rear direction will act on the floating prevention member, and a frictional force between the horizontal member and the pillars may reach a considerable level. On the other hand, if the floating prevention member has the rotary body as described above, a frictional force will be small, thus reducing force in the front and rear direction acting upon the floating prevention member. When the force in the front and rear direction acting upon the floating prevention member is small, a frictional force between the horizontal member and the pillar also stays small. Therefore, when the roller is mounted as described above, the freight mounting frame and the horizontal member may always be raised smoothly.

It is preferable that the above-described freight mounting frame is used for mounting vehicles and has tire supporting portions at two or more places on the front or rear part of the frame, and that the position of the tire supporting portions is adjustable in the front and rear direction.

When the two places of the front or rear part of the tire supporting portions are adjustable, the tire supporting portions can be arranged at an optimum position in accordance with the model or size of mounted vehicles, and thus the positions of automobiles can be appropriately adjustable. Accordingly, vehicles can be also efficiently arranged in the container.

It is preferable that wheels for front and rear movement are arranged at the bottom of the base member, and that a metal piece projecting downward is fixed to the rear bottom of the base member. In the example of FIG. 13, such a metal piece 14 is fixed to a base member 10 by welding in the lower right of FIG. 13.

As such a metal piece is provided at the bottom near the rear end of the base member, the front and rear movement of the freight rack with the wheels is prohibited while freight is being loaded on the freight mounting frame as in FIG. 13. It is preferable to carry the freight rack and freight (such as automobiles) into a container according to the procedure in FIG. 14. However, for that end, it is necessary to place freight on a lowered freight mounting frame 20 after the front end of the base member 10 is placed on the floor of a container A and the rear end of the base member 10 is placed on the ground as in FIG. 13. If rotating wheels 16 move the freight rack 1 forward and rearward in the state as in FIG. 13, freight could not be safely loaded on the freight mounting frame 20. In this sense, if the metal piece 14 is fixed to the bottom at rear end of the base member 10 to project downward as described above, the metal piece 14 will be pressed to the ground so as to stop the frontward and rearward movement of the freight rack 1 when the front part of a vehicle is placed on the floor of the container A and the base member 10 is inclined as in FIG. 13. Thus, it becomes possible to load freight on the freight mounting frame 20 safely.

It is particularly preferable that the base member has a frame that splits right and left at the rear part and a flat lower freight rack may be entered inside the frame from the rear, and that a coupling member to be connected to each left and right rear end of the base member is mounted to both right and left sides of the lower freight rack so as to allow positioning in the front and rear direction.

For example, it is assumed that, to the base member 10 having a frame that splits right and left as in FIG. 6, a flat lower freight rack 2 as in FIG. 10 is entered inside the frame, and freight B is housed inside the container A with the freight rack 1 and the lower freight rack 2 as in FIGS. 1A and 1B. In this case, the lower rack 2 has coupling members 56 on its right and left as in FIG. 10 so as to be connected to the rear end of the base member 10 of FIG. 6. If the position of the coupling member 56 is adjustable forward and rearward, the freight rack 1 and the lower freight rack 2 will be set in the appropriate, relative position in the front and rear direction by using the coupling members 56. That is, when the lower freight rack having the coupling members as described above is used along with a freight rack, freight can be housed appropriately as in FIGS. 1A and 1B and transported efficiently.

It is further preferable that the coupling member is built in a guide track arranged on both right and left sides of the lower freight rack and is movable in the front and rear direction, and that the coupling member and the rear end of the base member are formed so that a sharp portion (sharp tip portion) provided at one (in other words, either the coupling member or the rear end of the base member) fits in a concave portion having a V-shaped cross section provided at the other.

When the coupling members are built in the guide tracks arranged on the right and left of the lower freight rack, the above-described positioning in the front and rear direction can be performed quite smoothly. Moreover, when the coupling members and the rear end of the base member are formed so that the sharp portion fits in the concave portion having a V-shaped cross section, the relative positioning of the freight rack and the lower rack is spontaneously determined at a time when the freight rack and the lower rack are connected to each other. Even later, the relative positioning is maintained and right and left displacement is kept prohibited, which results in advantageous effect in firmly holding freight.

Advantageous Effects of Invention

According to the freight rack of the invention, each pillar for supporting a freight mounting frame is coupled with a horizontal member to constitute a portal support and stands on a base member, thereby enhancing the rigidity of the freight rack. This reduces right and left inclination or rocking of the pillar, the freight mounting frame, freight and so forth, so that freight may be transported stably.

When two sets of portal supports may be independently laid down on the base member, the portal support including each pillar and the freight mounting frame can be easily folded on the base member and reversibly returned to a usage state just by human power without use of a machine such as a forklift.

When a hollow member is provided on both right and left sides of a horizontal member of the portal support and the pillar is run through the member, the portal support can have an extremely simple structure and the freight rack may be constructed at low cost.

BRIEF DESCRIPTION OF DRAWINGS

FIGS. 1A and 1B are cross sectional side views (showing the interior) of the container A in which a plurality of automobiles B are housed as freight on freight racks 1 and lower freight racks 2, showing an embodiment according to the invention. FIG. 1A shows a state that three automobiles B are housed in the container A, and FIG. 1B shows another state that four slightly compact automobiles B are housed therein.

FIG. 7A is an enlarged view of a section VII in FIG. 3, FIG. 7B is a plan view thereof, FIG. 7C is a side view thereof, and FIG. 7D is an enlarged cross-sectional view of a section d in FIG. 7A.

FIG. 8A is an enlarged view of a section VIII in FIG. 4, and FIG. 8B is a side view thereof.

FIG. 9 is a side view, showing that folded freight racks 1 and lower freight racks 2 are stacked together.

DESCRIPTION OF EMBODIMENTS

FIGS. 1 to 15 illustrate an embodiment of the invention. A freight rack 1, along with a lower freight rack 2 that is arranged thereunder and has a plane structure, is composed of shape steel, steel tubes, steel plates, etc. as material. As in FIG. 1, automobiles B or the like are loaded and supported on the racks, and are housed inside a container A as they are, for automobile transportation by sea or land. Even when the size and model of the automobiles B or the like are changed, the most suitable loading condition, based on the size or the like of the automobiles B or the like, may be achieved as in FIGS. 1A and 1B. Moreover, after being used for automobile transportation or the like, the rack 1 is compactly folded as in FIG. 9 and loaded on the container A, and is then efficiently returned to a sender, etc. The configuration and usage of the freight rack 1 will be explained below.

The basic structure of the freight rack 1 is as shown in FIG. 2 to FIG. 8.

Figure 2:
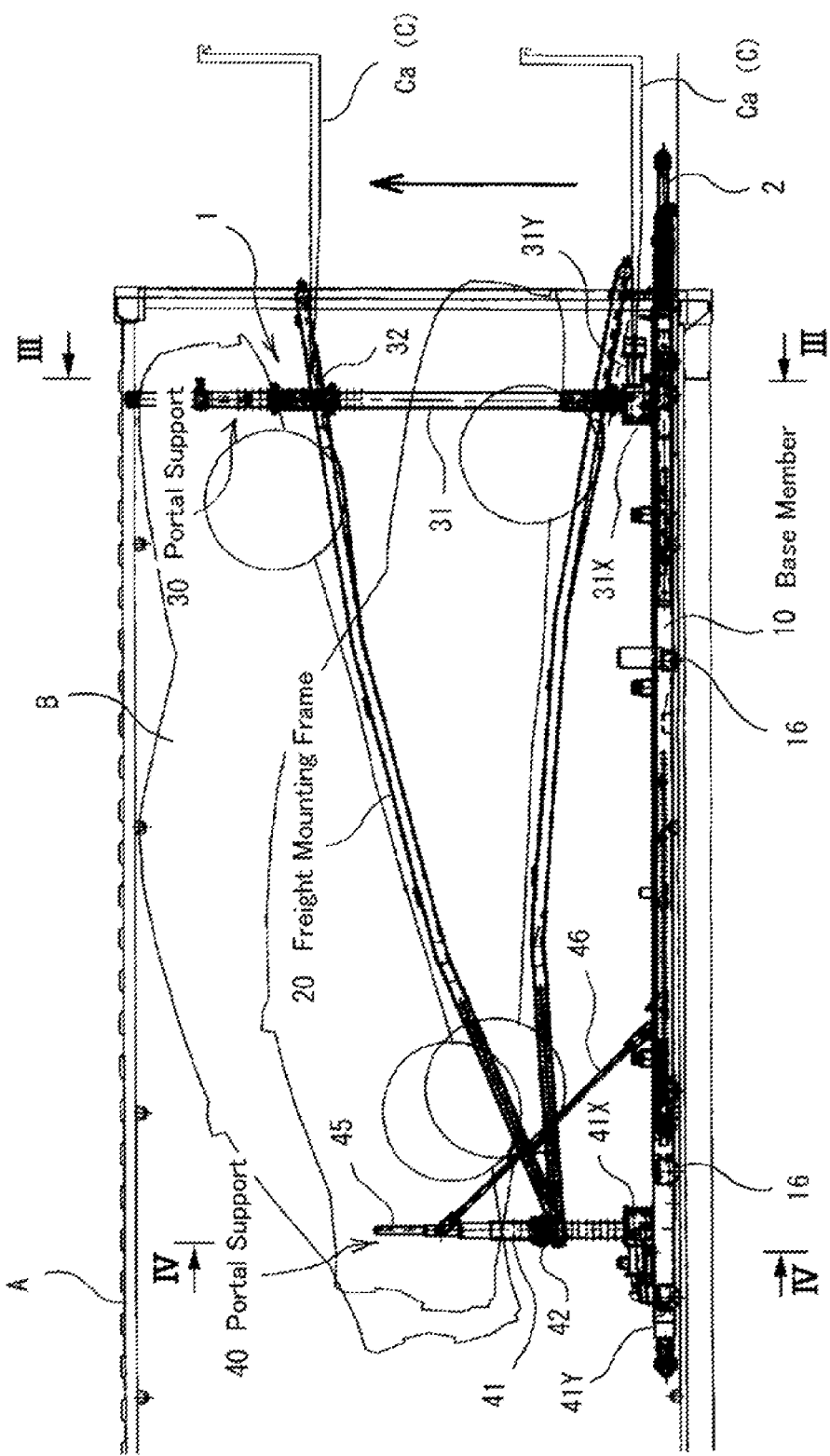
FIG. 2 is a side view of the freight rack 1 and so forth, showing the change of the height and angle of a freight mounting frame 20.

First, as in FIG. 2, two sets of portal supports 30 and 40 are configured to be erected on a base member 10 with an interval in a front and rear direction to support the freight mounting frame 20.

Figure 6:
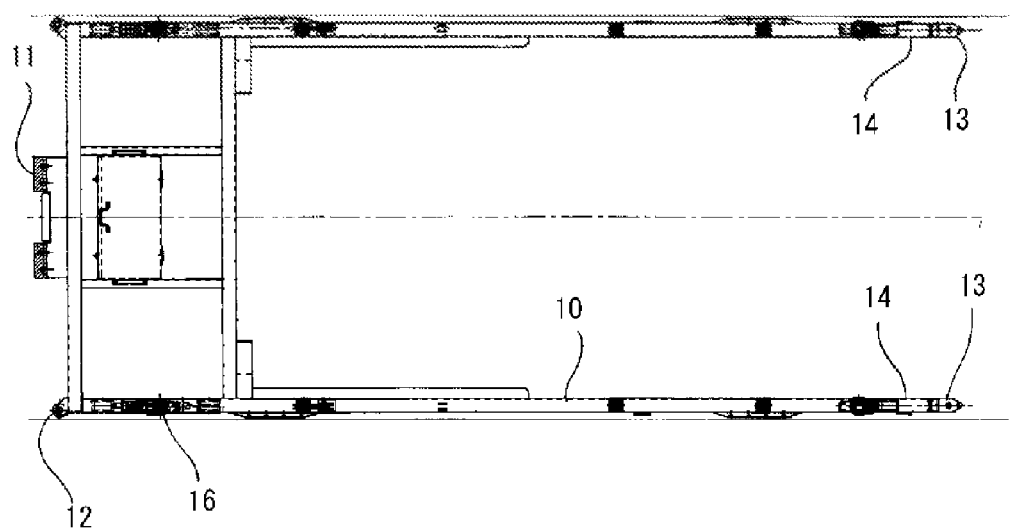
FIG. 6 is a plan view taken from an arrow VI-VI of FIG. 3, showing a base member 10.

The base member 10 is a structure configured mainly by a frame as in FIG. 6, and has a plurality of wheels 16 at the bottom thereof as in FIG. 2 so as to move forward and rearward on the floor plate of the container A. Because of the wheels 16, the freight rack 1 can move in the front and rear direction of the container A, along with automobiles B, by being pushed by a worker or so forth while the automobiles B are being loaded. It is noted that the wheels 16 are not provided at the bottom surface around the rear end of the base member 10, and metal pieces 14, made of a reinforcing rod having about 10 mm diameter, are horizontally welded thereto to provide downward projections.

Figure 5:
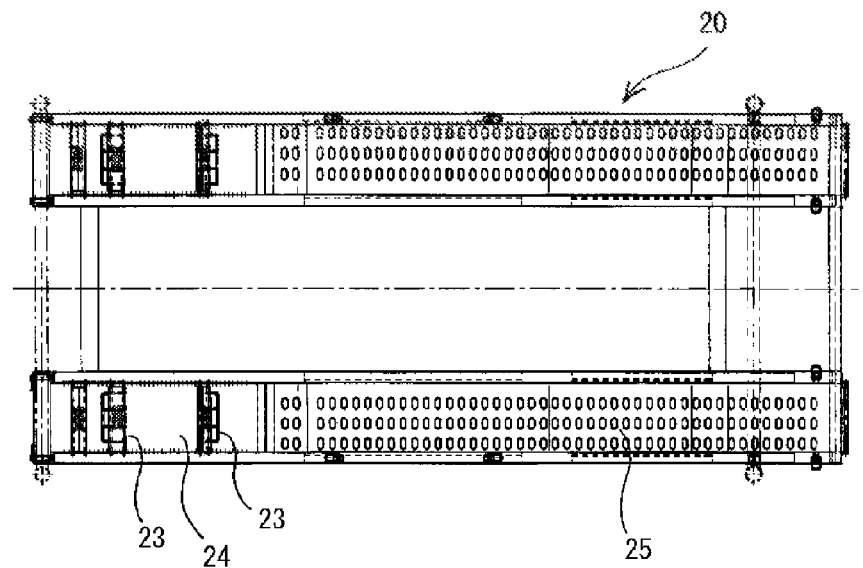
FIG. 5 is a plan view taken from an arrow V-V of FIG. 3, showing the freight mounting frame 20.

The freight mounting frame 20 has deck panels 25 on the right and left as in FIG. 5, and tire supporting members 23 are arranged at the front of the frame and the gap between the members is a wheel locking space 24 so as to load the automobile B thereon. Although the frame is an integrated plane, it is slightly curved with upward convexity as in FIG. 2, depending on the bottom shape (having a space between front and rear wheels) of an automobile loaded at the top and the roof of an automobile (which is generally higher around the center of the automobile) arranged underneath the frame. The position and inclination of the freight mounting frame 20 may be changed by changing the supporting height by each of the front and rear portal supports 30 and 40 (see FIG. 2), thereby allowing appropriate loading based on the size or the like of the automobiles B.

Figure 3:
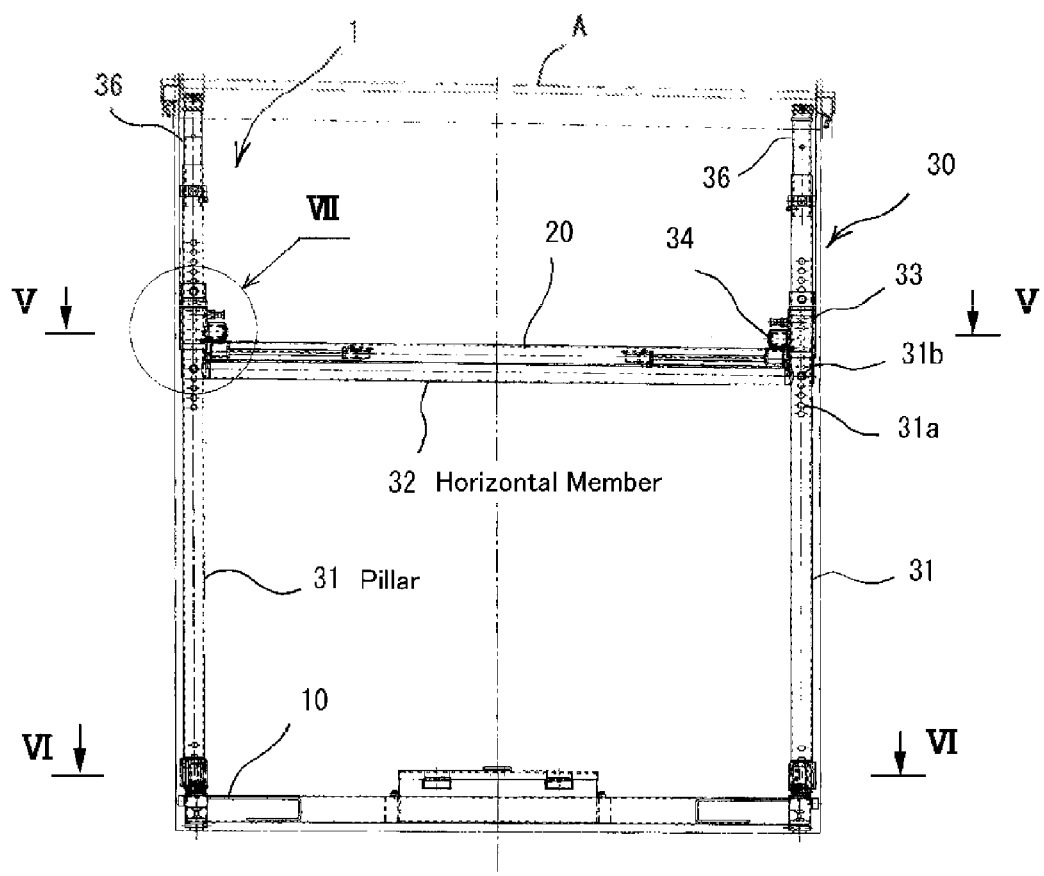
FIG. 3 is a view taken from an arrow III-III of FIG. 2, showing a portal support 30 and so forth.
Figure 4:
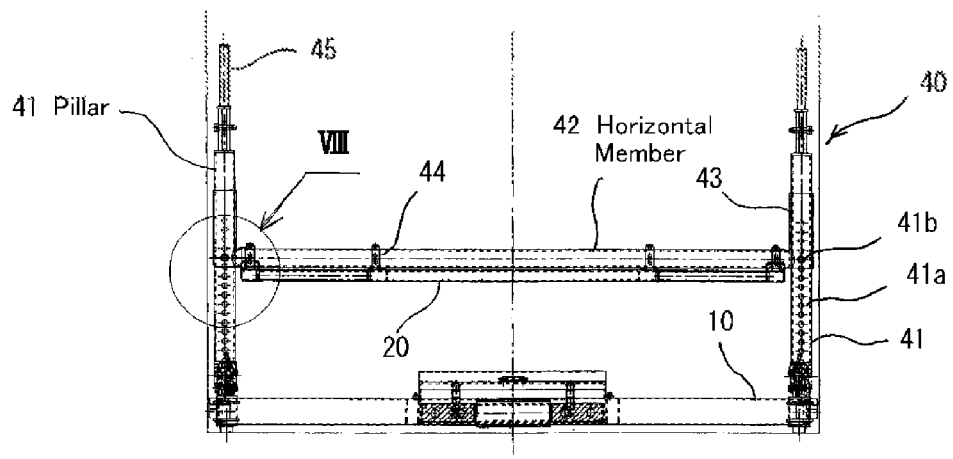
FIG. 4 is a view taken from an arrow IV-IV of FIG. 2, showing a portal support 40 and so forth.

As illustrated in FIG. 3 and FIG. 4, each portal support 30, 40 has right and left straight pillars 31, 41 and a horizontal member 32, 42 vertically shiftable along the pillars, which are coupled to each other in a portal shape.

For the tall portal support 30 standing at the rear side, the horizontal member 32 is coupled to the right and left two pillars (rear pillars) 31, made of a round steel tube, and can shift vertically along the pillars 31. As anchoring holes 31a are provided at a plurality of locations on the pillars 31, the horizontal member 32 is fixed to the pillars 31 at a selected height by inserting height setting pins 31b into any of the holes.

Similarly, for the short portal support 40 standing at the front side, the right and left two pillars (front pillars) 41, made of a round steel tube, are coupled with the horizontal member 42, and the horizontal member 42 can shift vertically along the pillars 41. Like the portal support 30 at the rear side, anchoring holes 41a are provided at a plurality of locations on the pillars 41 and the horizontal member 42 is fixed to the pillars at a height by inserting height setting pins 41b into any of the holes.

Each horizontal member 32, 42 of the front and rear portal support 30, 40 has a hollow member 33, 43 as a unit on both right and left sides, as shown in FIGS. 7A and 7B and FIGS. 8A and 8B, and the pillar 31, 41 is run through the hollow member so as to allow relative shift in a vertical direction. The hollow member 33, 43 is formed of a round steel tube having an inner diameter that is slightly larger than the pillar 31, 41, so that there is a gap of several millimeters or less with the outer peripheral surface of the pillar 31, 41 that is also a round steel tube. Both of the hollow members 33 and 43 are, as in FIG. 7D, chamfered at its corners between its inner circumferential surface and top and bottom end faces, thus forming the original corner into a smooth curved surface 33r.

Since the pillars 31 and 41 and the horizontal members 32 and 42 are structured with round steel tubes, which are coupled together as described above, the portal supports 30 and 40 have a simple structure, also have excellent rigidity with little inclination to right or left, and can reduce the manufacturing cost.

As in FIG. 2, the front portion of the freight mounting frame 20 is supported in a rotatable manner in a vertical plane by the horizontal member 42 of the portal support 40, and the rear portion thereof is placed on the horizontal member 32 of the portal support 30. Specifically, for the front portal support 40, a round steel tube is used for the horizontal member 42, to which, as in FIG. 4 and FIG. 8A, a rotatable ring-like support member 44 is mounted. The part near the front end of the freight mounting frame 20 is suspended from the bottom of the support member 44 with being coupled to each other.

Meanwhile, as shown in FIG. 3 and FIG. 7A, the rear portion of the freight mounting frame 20 is supported by being placed on the horizontal member 32 of the portal support 30. Since this horizontal member 32 is also formed of a round steel tube and no concavities and convexities, or the like are formed at the top surface of the horizontal member as well as at the bottom surface of the freight mounting frame 20, the freight mounting frame 20 can be moved relatively to the horizontal member 32 in the front and rear direction while being placed on the top surface of the member 32.

In order to prevent the freight mounting frame 20 placed on the horizontal member 32 from moving upward independently from the horizontal member 32, a floating prevention member 34 is mounted on the horizontal member 32 as in FIG. 7. With this member, the freight mounting frame 20 is prevented from lifting up and so forth even if there are vibrations or the like during transportation. The floating prevention member 34 is a shaft projecting laterally from a short tube 34a covering the hollow member 33 at the right and left of the horizontal member 32. As in FIG. 7B, the orientation of the member 34 may be turned by 90°, along with the short tube 34a, around the hollow member 33. By changing the orientation, the floating prevention member 34 may project above the freight mounting frame 20 or may be retracted from the above. On the outside of the short tube 34a, an index plunger 35 is mounted so as to insert a locking pin through a hole of the short tube 34a to a hole of the hollow member 33 with spring force. By manipulating the index plunger 35, the orientation of the floating prevention member 34 can be changed and then locked.

With the floating prevention member 34 projecting above the freight mounting frame 20 as in FIG. 7A, when the freight mounting frame 20 is raised as in FIG. 2, the horizontal member 32 may also rise simultaneously. Thus, the height of the freight mounting frame 20 as well as the horizontal member 32 may be adjusted at the same time. In this case, the freight mounting frame 20 moves in the front and rear direction relative to the horizontal member 32. In order to reduce frictional force caused by such movement, a rotatable roller 34b is mounted on the periphery of the floating prevention member 34 as in FIG. 7A. The frictional force is reduced by the roller 34b and forward and rearward force acting on the horizontal member 32 becomes small, thereby allowing the smooth movement of the horizontal member 32 along the pillars 31.

It is noted that, at the top end of each pillar 31 of the portal support 30 shown in FIG. 3, an extending pillar 36 is mounted so as to extend further upward for anchoring. Those pillars are to prevent the automobiles B from being damaged from rising up too high when the freight mounting frame 20 is raised as described above (see FIG. 2). This is because, when the freight mounting frame 20 is being raised, the height setting pin 31b is inserted through the higher hole 31a of the pillar 31 beforehand for an upper limit position, however, with too much force by a forklift C, there is a possibility that the whole rear part of the freight rack 1 is lifted further and thus the freight mounting frame 20 is raised excessively. If the extending pillars 36 are beforehand extended up close to the ceiling of the container A, such a problem would be avoided.

The portal supports 30 and 40 standing on the base member 10 are coupled to the base member 10 with support pins 31X and 41X or the like at the lower part shown in FIG. 2. The portal support 40 is also connected to the base member 10 with an auxiliary bar 46 provided between the upper portion of the support and the base member 10. By leaving only the support pins 31X, 41X having a common center line and removing the rest of the pins and the auxiliary bar 46, the portal supports 30 and 40 may be laid down (folded) over the base member 10 respectively.

In folding the rear portal support 30, the above-described floating prevention member 34 (see FIG. 7) needs to be retracted in advance from above the freight mounting frame 20. Additionally, the freight mounting frame 20 is lowered together with the horizontal member 32, and then the portal support 30 is tilted forward with human power after some of the support pins are removed as described above. Then, the portal support 30 is laid down forward independently from the freight mounting frame 20 and the front portal support 40 while the freight mounting frame 20 is kept on the horizontal member 32, and is stacked on the base member 10.

For the front portal support 40, the freight mounting frame 20 is lowered along with the horizontal member 42, and the portal support 40 is tilted rearward with human power after the above-described auxiliary bar 46 and some of the support pins are removed. Then, while pushing and moving rearward the coupled freight mounting frame 20, the front portal support 40 is laid down rearward independently from the rear portal support 30 and is stacked on the base member 10. Near the tips of the portal support 40, there provided are extending portions 45 for operation, in order to make manual operation easy with the principle of leverage.

With the operation reverse from the above, the portal supports 30 and 40 may be erected individually on the base member 10.

As shown in FIG. 2, at the lower ends of the portal supports 30 and 40, there provided are stacking support pieces 31Y and 41Y that are extending perpendicular to each pillar 31 and 41. When the portal supports 30 and 40 are laid down on the base member 10 as described above, those support pieces 31Y and 41Y, instead of the pillars 31 and 41, stand upward. When the portal supports 30 and 40 are laid down and then the freight rack 1 is folded, the freight racks 1 may be stacked in multiple levels by using the support pieces 31Y and 41Y as in FIG. 9.

Figure 10:
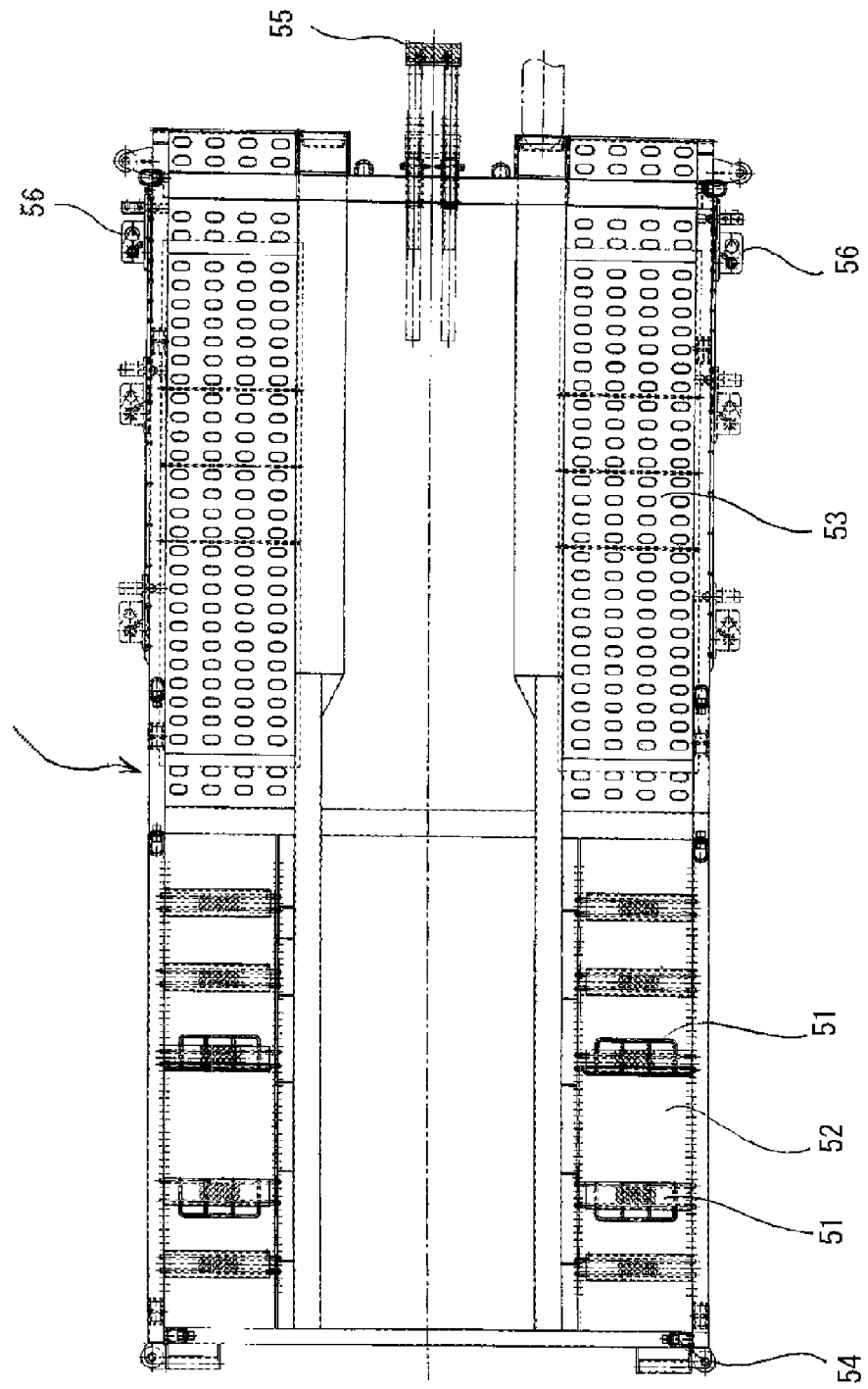
FIG. 10 is a plan view of the lower freight rack 2.

In the case of arranging the automobile B also underneath the freight mounting frame 20 of the freight rack 1, the lower freight rack 2 shown in FIG. 10 is used. The lower rack 2 is flat in which tire supporting members 51 are arranged on the front right and left sides, providing a wheel locking space 52 between the members, deck panels 53 are mounted on the rear right and left sides, and wheels (not shown) are provided at the bottom so as to allow front and rear movement.

A guide roller 54 is provided at the front end of the lower rack 2 so as to let the rack 2 smoothly enter between the right and left frames of the base member 10 of the freight rack 1 (in FIG. 6) by front and rear movement. Also, in order to position the lower rack 2 appropriately in relation to the base member 10 of the freight rack 1 when it is entered, coupling members 56 are also mounted at the right and left sides of the lower rack 2. The coupling members 56 are mounted through guide tracks at the sides of the lower rack 2 so as to change position in the front and rear direction. The member 56 has a V-shaped concave into which a sharp projection 13

(see FIG. 6) at the rear end of the base member 10 of the freight rack 1 fits, and also a pin hole for coupling the rack 2 to the base member 10. By setting the position of the tire support members 23 of the freight mounting frame 20 (FIG. 5), and the positions of the tire support members 51 (FIG. 10) and the coupling members 56 of the lower rack 2 appropriately in advance based on the size or the like of the loaded automobile B, there is no possibility that the body of the automobile B contacts the other automobiles B or the rack 1, etc. even without positioning after carrying the automobile into the container A.

In addition, a damper member 55 is provided at the rear end of the lower rack 2 as in FIG. 10. The damper member 55 is made of a hollow rubber material mounted on the tip of a support tool having adjustable length. Also at the front end of the base member 10 of the above-described freight rack 1, a damper member 11 including a hollow rubber material (see FIG. 6) is provided. Due to the buffering action of those damper members 11 and 55, contacts between the base member 10 and the lower rack 2 and between these and the wall surface or an entrance door of the container A may be made elastic.

Figure 11:
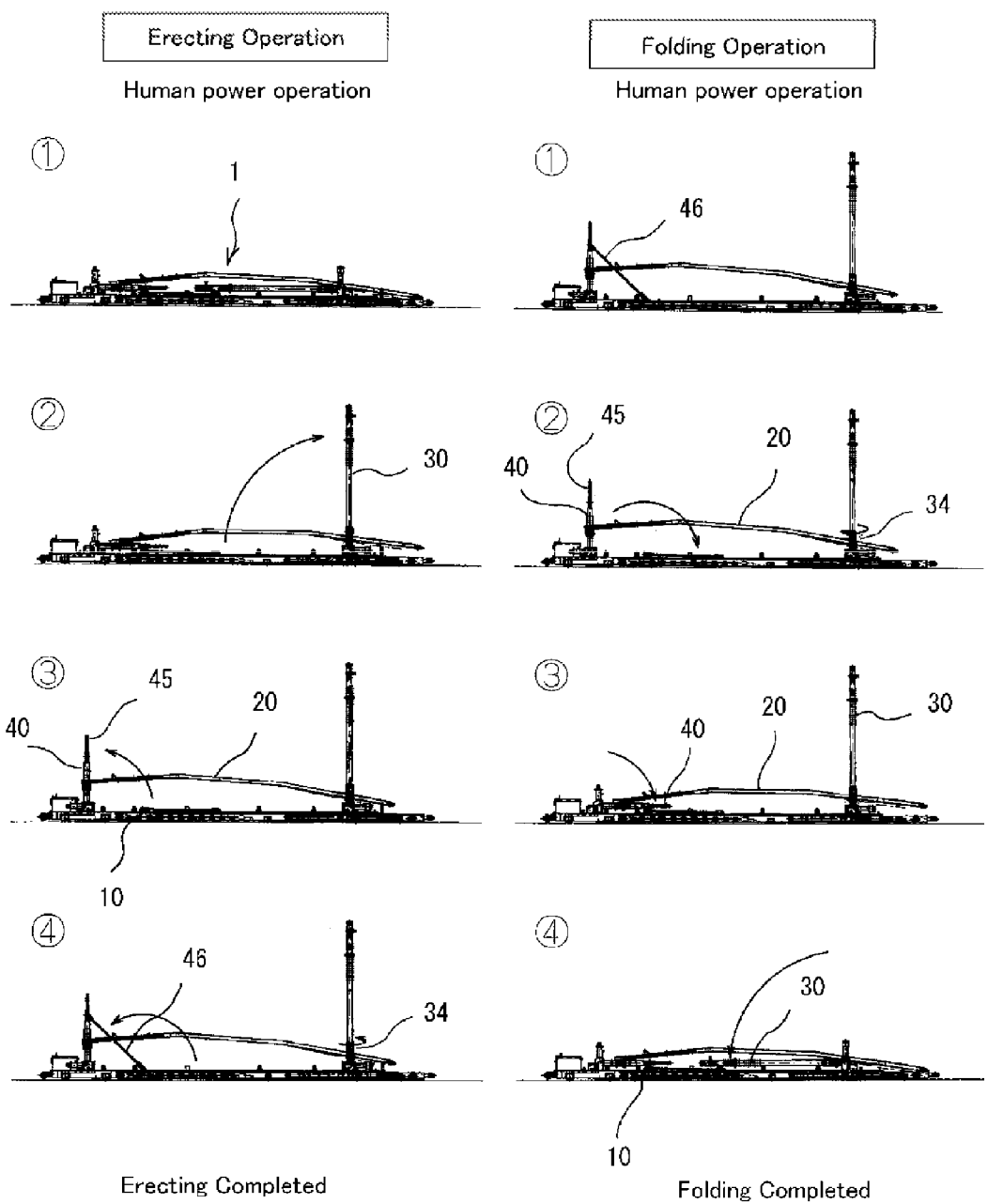
FIG. 11 shows, in four diagrams on the left side (in order from top 1 to 4), a procedure to erect the portal supports 30 and 40 of the freight rack 1 in a folded state; and shows, in four diagrams on the right side (in order from top 1 to 4), a procedure to lay down the erected portal supports 30 and 40 on the base member 10 (fold the freight rack 1).

The freight rack 1, based on the procedure shown in FIG. 11, may be erected (for use) from the folded state, or reversibly folded. The procedure on the left side of the figure is followed for erecting the rack while the procedure on the right side of the figure is followed for folding the rack. Since the front and rear portal supports 30 and 40 may be laid down or erected one set by one set, instead of simultaneously, a series of operations in the figure may be performed only by human power (without using a machine).

Figure 12:
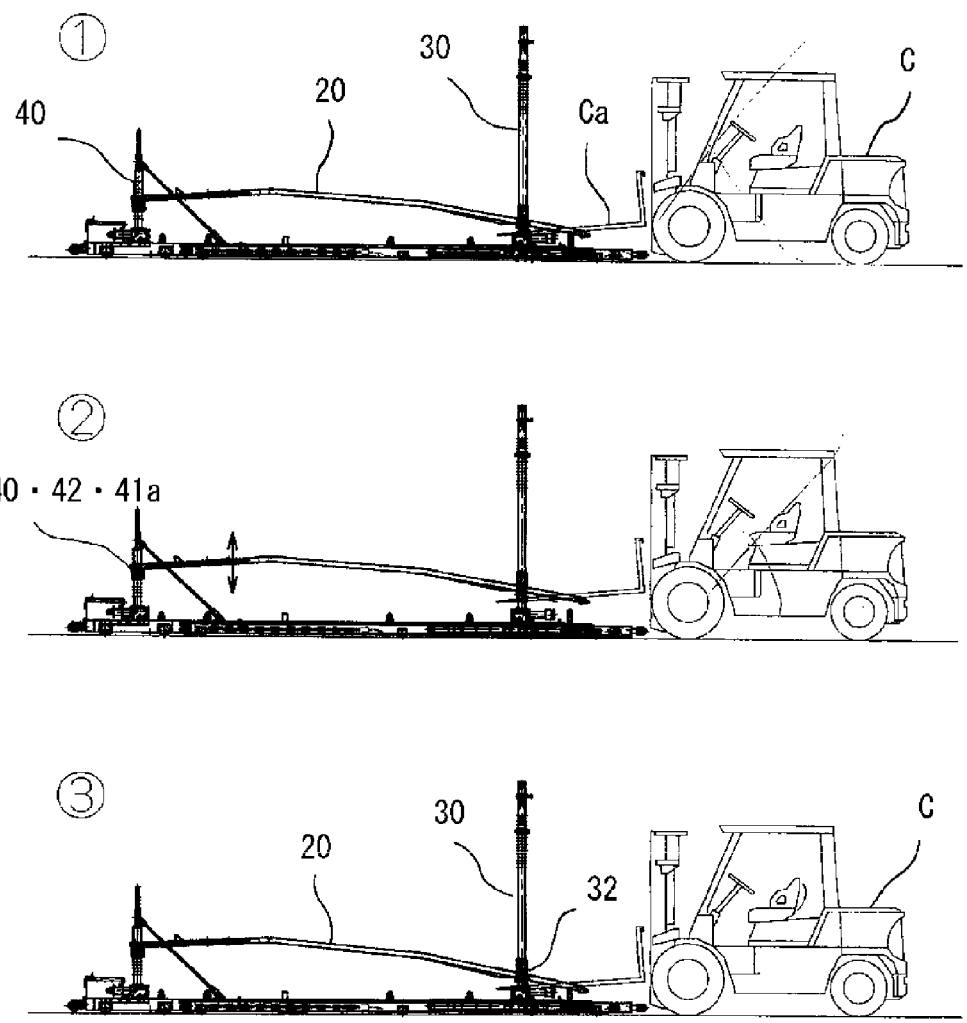
FIG. 12 shows, in three diagrams (in order from top 1 to 3), a procedure to adjust the height of a horizontal member 42 of the portal support 40 while the portal supports 30 and 40 are in an erected state.

After each portal support 30 and 40 of the freight rack 1 is erected, the height of the horizontal member 42 of the front portal support 40 may be adjusted as in FIG. 12. That is, a fork Ca of the forklift C is inserted to the freight mounting frame 20, and then shifts the freight mounting frame 20 vertically with the fork Ca while the height setting pins 31b and 41b (see FIG. 3 and FIG. 4) are removed. At an appropriate height of the horizontal member 42, the height setting pins 41b are inserted to the pillars (front pillars) 41.

Figure 13:
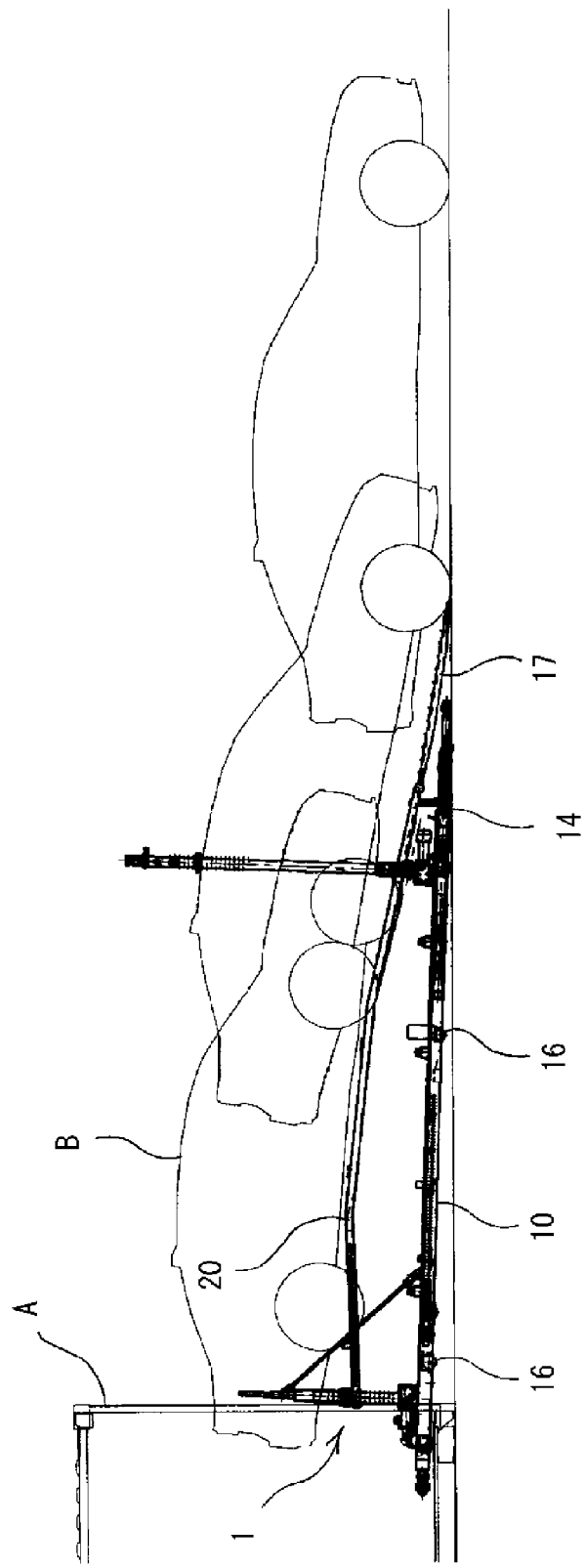
FIG. 13 is a side view, showing that an automobile B is being loaded on the freight mounting frame 20 of the freight rack 1.

The automobile B may be carried onto and out from the freight mounting frame 20 of the freight rack 1 as in FIG. 13. That is, the front end of the base member 10 is placed on the floor of the container A while the rear end of the base member 10 is placed on the ground. The freight mounting frame 20 is lowered, and an auxiliary slope 17 is connected to the rear end of the frame. The base member 10 has the plurality of wheels 16 with no brake or the like. However, as in the figure, the above-described metal pieces 14 provided at the rear bottom surface of the base member 10 are pressed to the ground, thus preventing the frontward and rearward movement. Thus, the automobile B may be safely carried onto and out from the freight mounting frame 20.

Even for the lower freight rack 2, the wheels and reinforcing rod pieces are similarly provided at the bottom surface, so that it is preferable to carry the automobile B onto and out from the rack while the front end thereof is placed on the floor of the container A and the rear end thereof is placed on the ground as in FIG. 13.

Figure 14:
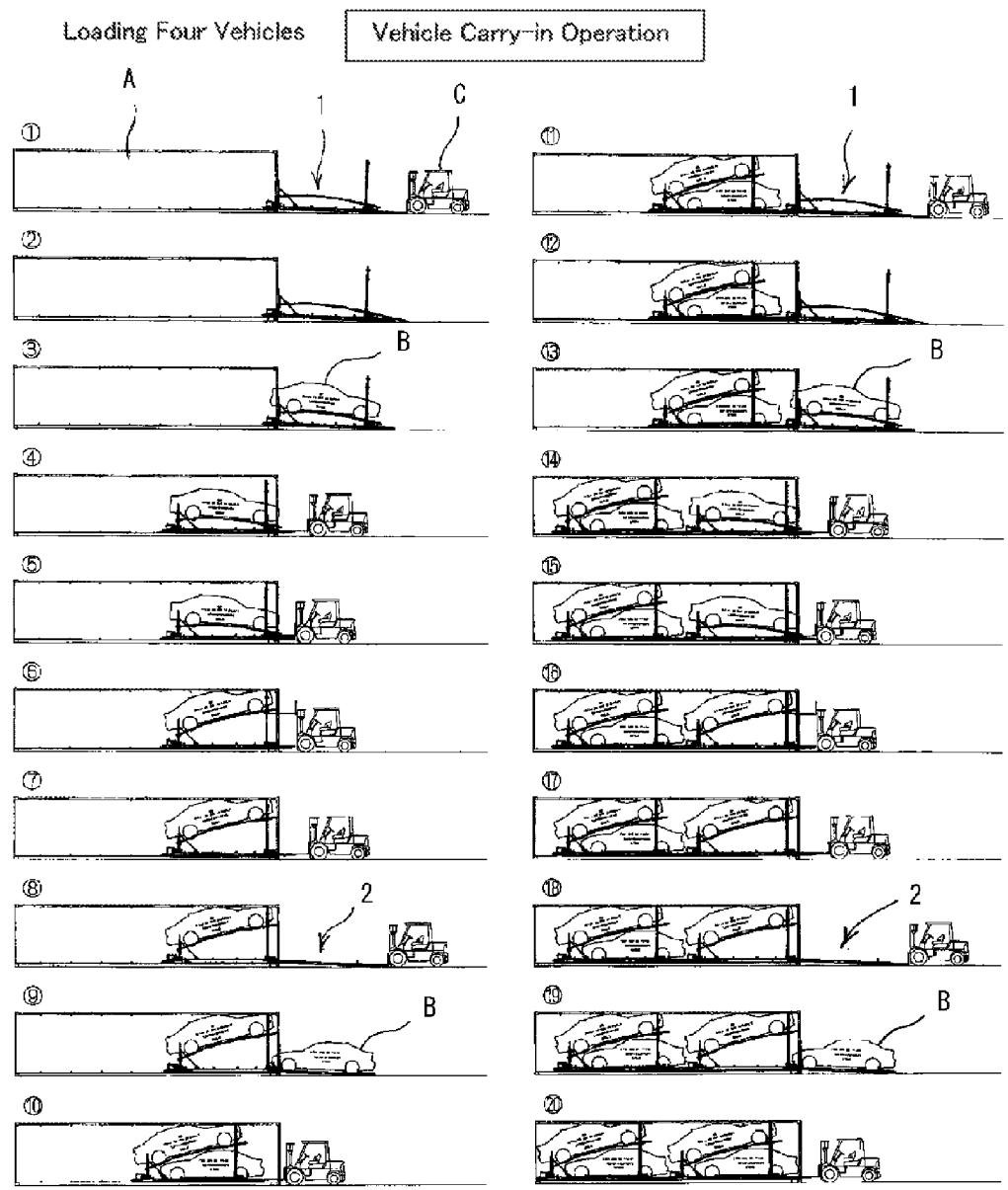
FIG. 14 shows, in 20 diagrams, in order from 1 to 10 on the left side and then from 11 to 20 on the right side, an operation procedure to carry four automobiles B into a container A along with racks 1 and 2.
Figure 15:
FIG. 15 shows, in 20 diagrams, in order from 1 to 10 on the left side and then from 11 to 20 on the right side, an operation procedure to carry out four automobiles B in the container A along with racks 1 and 2.
Figure 16A:
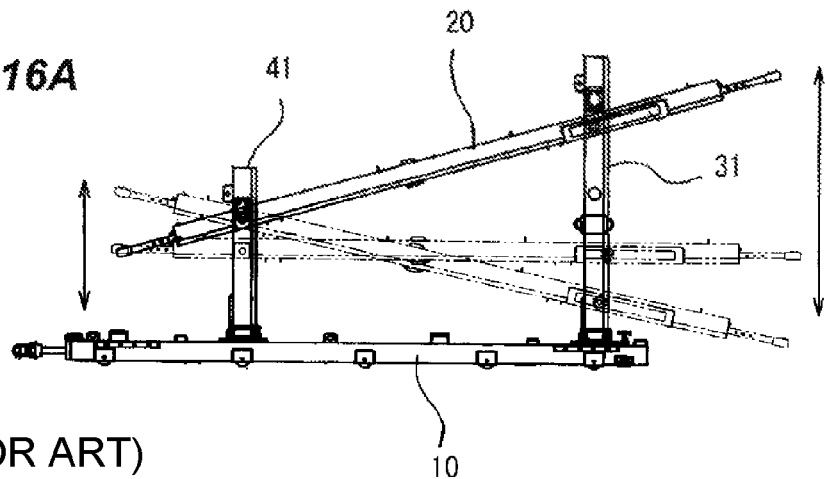
FIG. 16A is a side view of a conventional freight rack.
Figure 16B:
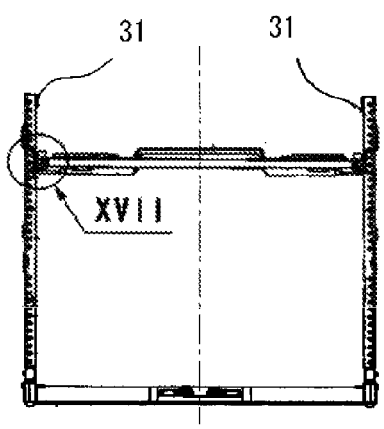
FIG. 16B is an elevation view thereof, showing pillars 31 and so forth.
Figure 16C:
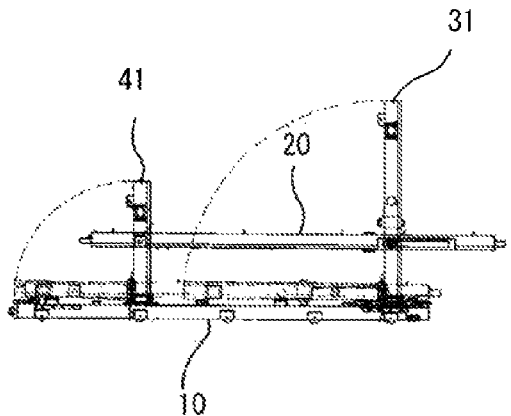
FIG. 16C is a side view thereof, showing the state right before pillars 31 and 41 are laid down.
Figure 16D:
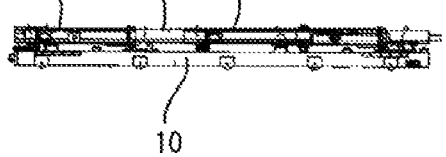
FIG. 16D is a side view thereof, showing the state where the pillars and so forth were laid down and folded.
Figure 17B:
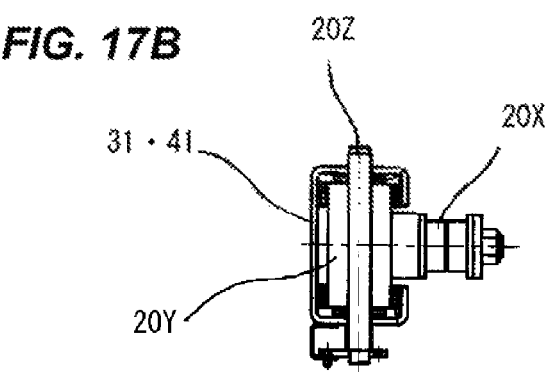
FIG. 17B is a plan view thereof.
Figure 17A:
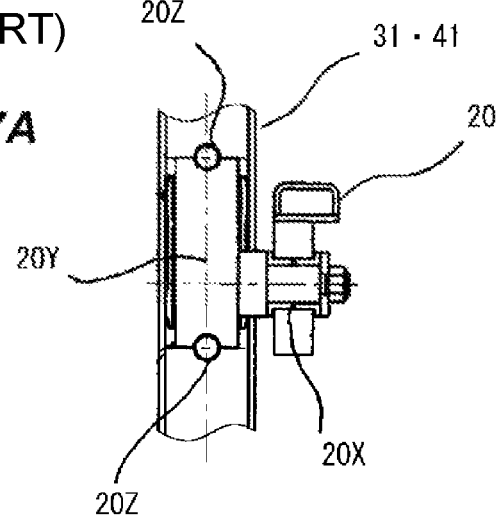
FIG. 17A is a detail view of a section XVII in FIG. 16B.

The procedure shown in FIG. 14 and FIG. 15 may be followed with using the forklift C, for the operation of carrying the automobiles B into and out from the container A, including carrying them onto and out from the freight rack 1 (freight mounting frame 20) and the lower rack 2 as described above.

REFERENCE SIGNS LIST

1 Freight rack
2 Lower freight rack
10 Base member
20 Freight mounting frame
30, 40 Portal support
31, 41 Pillar
32, 42 Horizontal member
33, 43 Hollow member
34 Floating prevention member
44 Support member
A Container
B Automobile (freight)
C Forklift

The invention claimed is:

1. A freight rack comprising a base member that is movable in a front and rear direction on a floor plate of a container, and a freight mounting frame that is supported above the base member and that is for mounting freight, wherein
two sets of portal supports, in which right and left pillars and a horizontal member are coupled to each other, stand on the base member with an interval in the front and rear direction, where the horizontal member is vertically shiftable along the pillars and fixed to the pillars at a selected height,
the freight mounting frame is supported by the horizontal member of one portal support so as to be rotatable in a vertical plane and is also placed on the horizontal member of the other portal support so as to be movable in the front and rear direction, and
there is no other member to connect the right and left pillars with each other above each of the horizontal members, and each of the two sets of portal supports standing on the base member allows to be individually laid down on the base member so as to become parallel to the base member.

2. The freight rack according to claim 1, wherein
the horizontal member in each of the portal supports has a hollow member on both right and left sides, and the pillar is run through the hollow member.

3. The freight rack according to claim 1, wherein
a floating prevention member for the freight mounting frame is provided at the portal support where the freight mounting frame is placed on the horizontal member; and
the floating prevention member projects above the freight mounting frame so as to prevent the freight mounting frame from rising independently from the horizontal member and also allows to be moved from above the freight mounting frame at the time when the two sets of portal supports are laid down.

4. The freight rack according to claim 3, wherein
the floating prevention member in the portal support has a rotary body at a part where the floating prevention member is in contact with the freight mounting frame while projecting above the freight mounting frame.

5. The freight rack according to claim 1, wherein
the base member has a frame that splits right and left at a rear part thereof, allowing a flat lower freight rack to enter inside the frame from the rear; and
the lower freight rack is provided with a coupling member, on both right and left sides thereof, to be connected to each right and left rear end of the base member, so as to allow positioning in the front and rear direction.

6. The freight rack according to claim 5, wherein the coupling member is built in a guide track arranged on both right and left sides of the lower freight rack and is movable in the front and rear direction; and the coupling member and the rear end of the base member are formed so that a sharp portion provided at either one of the coupling member or the rear end of the base member fits into a concave portion having a V-shaped cross section provided at the other.

* * * * *